US010195990B2

(12) United States Patent
Moriwaki

(10) Patent No.: US 10,195,990 B2
(45) Date of Patent: Feb. 5, 2019

(54) IN-VEHICLE LIGHTING DEVICE AND VEHICLE

(71) Applicant: PANASONIC INTELLECTUAL PROPERTY MANAGEMENT CO., LTD., Osaka (JP)

(72) Inventor: Toshiya Moriwaki, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/920,046

(22) Filed: Mar. 13, 2018

(65) Prior Publication Data
US 2018/0272935 A1 Sep. 27, 2018

(30) Foreign Application Priority Data

Mar. 24, 2017 (JP) ................................. 2017-059851

(51) Int. Cl.
*B60Q 9/00* (2006.01)
*H05B 33/08* (2006.01)
*B60Q 3/80* (2017.01)
*B60Q 3/70* (2017.01)

(52) U.S. Cl.
CPC ............... *B60Q 9/008* (2013.01); *B60Q 3/70* (2017.02); *B60Q 3/80* (2017.02); *H05B 33/0872* (2013.01)

(58) Field of Classification Search
CPC ................................ B60Q 1/0023; B60Q 3/00
See application file for complete search history.

(56) References Cited

U.S. PATENT DOCUMENTS

| 5,303,205 | A | * | 4/1994 | Gauthier | B60Q 1/0023 367/108 |
|---|---|---|---|---|---|
| 2004/0090317 | A1 | * | 5/2004 | Rothkop | B60Q 9/008 340/435 |
| 2007/0228262 | A1 | | 10/2007 | Cantin et al. | |
| 2008/0239527 | A1 | | 10/2008 | Okabe et al. | |
| 2017/0320430 | A1 | * | 11/2017 | Kawamata | B60K 35/00 |

FOREIGN PATENT DOCUMENTS

| JP | 2004-295472 A | 10/2004 |
|---|---|---|
| JP | 2008-265719 A | 11/2008 |
| JP | 2010-155496 A | 7/2010 |
| JP | 2010-529932 A | 9/2010 |
| JP | 2016-049897 A | 4/2016 |

* cited by examiner

*Primary Examiner* — Phung Nguyen
(74) *Attorney, Agent, or Firm* — McDermott Will & Emery LLP

(57) ABSTRACT

An in-vehicle lighting device for alerting a driver driving a vehicle to an obstacle present in a vicinity of the vehicle, which obstructs driving of the vehicle. The in-vehicle lighting device includes: a light emitter that is installed in an interior side of a pillar in a front part of the vehicle and that emits light of different chromatic colors; a controller connected to the light emitter; and a detector that is connected to the controller and detects the obstacle present in the vicinity of the vehicle. When the detector detects the obstacle present in the vicinity of the vehicle, the controller causes the light emitter to emit light having a color according to a characteristic of the obstacle detected.

7 Claims, 12 Drawing Sheets

US 10,195,990 B2

IN-VEHICLE LIGHTING DEVICE AND VEHICLE

CROSS REFERENCE TO RELATED APPLICATION

This application claims the benefit of priority of Japanese Patent Application Number 2017-059851 filed on Mar. 24, 2017, the entire content of which is hereby incorporated by reference.

BACKGROUND

1. Technical Field

The present disclosure relates to an in-vehicle lighting device and a vehicle including the in-vehicle lighting device.

2. Description of the Related Art

Conventionally, the functions of a device that notifies a driver driving a vehicle of the surrounding conditions of the vehicle have been dramatically improved. Japanese Unexamined Patent Application Publication (Translation of PCT Application) No. 2010-529932 (PTL1) discloses a method for detecting an obstacle present in the traveling direction of a vehicle, using an obstacle detector, such as a camera or radar, for detecting an obstacle that obstructs driving of the vehicle, and alerting a driver driving the vehicle to the presence of the obstacle.

Japanese Unexamined Patent Application Publication No. 2008-265719 (PTL2) discloses a driver assistance method in which an image of a blind spot created by a pillar of a vehicle is captured by an imaging device installed in the vehicle and the image representing the blind spot is displayed on the interior side of the pillar. With such a method, the image of the blind spot created by the pillar is displayed on the pillar, and therefore, safety driving can be enhanced.

SUMMARY

However, even though the obstacle detector according to PTL1 detects an obstacle, when the driver cannot visually confirm the presence of the obstacle, in some cases, the driver might continue the driving operation. For example, in the case where an obstacle is present in either of the blind spots created by the pillars located in both right front and left front of a driver's seat, when a vehicle turns right or left, even though the obstacle detector detects the obstacle, the driver of the vehicle might not be able to visually confirm the obstacle because of the pillar and might continue the driving operation in some cases.

In addition, in the driver assistance method according to PTL2, an image of the blind spot created by the pillar is displayed on the pillar. The problem, however, is that it is difficult for a driver driving a vehicle to know whether or not an obstacle that obstructs the driving of the vehicle is present in the displayed image.

The present disclosure therefore has an object to provide an in-vehicle lighting device that enhances safety driving, and a vehicle including the in-vehicle lighting device.

An in-vehicle lighting device according to one aspect of the present disclosure is an in-vehicle lighting device for alerting a driver driving a vehicle to an obstacle present in a vicinity of the vehicle, which obstructs driving of the vehicle. The in-vehicle lighting device includes: a light emitter that is installed in an interior side of a pillar located in a front part of the vehicle and that emits light of different colors; a controller connected to the light emitter; and a detector that is connected to the controller and detects the obstacle present in the vicinity of the vehicle. When the detector detects the obstacle present in the vicinity of the vehicle, the controller causes the light emitter to emit light having a color according to a characteristic of the obstacle detected.

In addition, a vehicle according to one aspect of the present disclosure includes the above-described in-vehicle lighting device.

With the in-vehicle lighting device according to the present disclosure and the vehicle including the in-vehicle lighting device, safety driving is further enhanced.

BRIEF DESCRIPTION OF DRAWINGS

The figures depict one or more implementations in accordance with the present teaching, by way of examples only, not by way of limitations. In the figures, like reference numerals refer to the same or similar elements.

DETAILED DESCRIPTION OF THE EMBODIMENTS

Hereinafter, the in-vehicle lighting device and vehicle according to the embodiment will be described with reference to the drawings. Note that the subsequently-described embodiments show a comprehensive or specific example of the present disclosure. The numerical values, structural components, the arrangement and connection of the components as well as steps and the sequence of the steps, etc. shown in the following embodiments are mere examples, and do not intend to limit the scope of the present disclosure. Furthermore, among the structural components in the following embodiments, components not recited in any one of the independent claims which indicate the broadest concepts of the present disclosure are described as arbitrary structural components.

Note that the respective figures are schematic diagrams and are not necessarily precise illustrations. In addition, in the respective figures, substantially identical components are assigned the same reference signs, and overlapping description is omitted or simplified.

Moreover, the term "front" used in the following embodiment is a traveling direction when the vehicle according to the present embodiment moves forward.

Moreover, in the following embodiment, a Z-axis direction is, for example, a vertical direction, a Z-axis positive direction side is upper side (upward), a Z-axis negative direction side is down side (downward), in some cases. Moreover, a Y-axis direction is, for example, a traveling direction of a vehicle, a Y-axis positive direction side is referred to as front, and a Y-axis negative direction side is referred to as rear, in some cases. Moreover, an X-axis direction is bilateral direction of the vehicle, and an X-axis positive direction side is referred to as right, and an X-axis negative direction side is referred to as left, in some cases. Furthermore, the X-axis and Y-axis directions are mutually orthogonal in a plane (i.e., a horizontal plane) vertical to the Z-axis.

EMBODIMENT

[Configuration of In-Vehicle Lighting Device]

The following describes a configuration of an in-vehicle lighting device according to an embodiment of the present disclosure and a vehicle including the in-vehicle lighting device.

Figure 1:
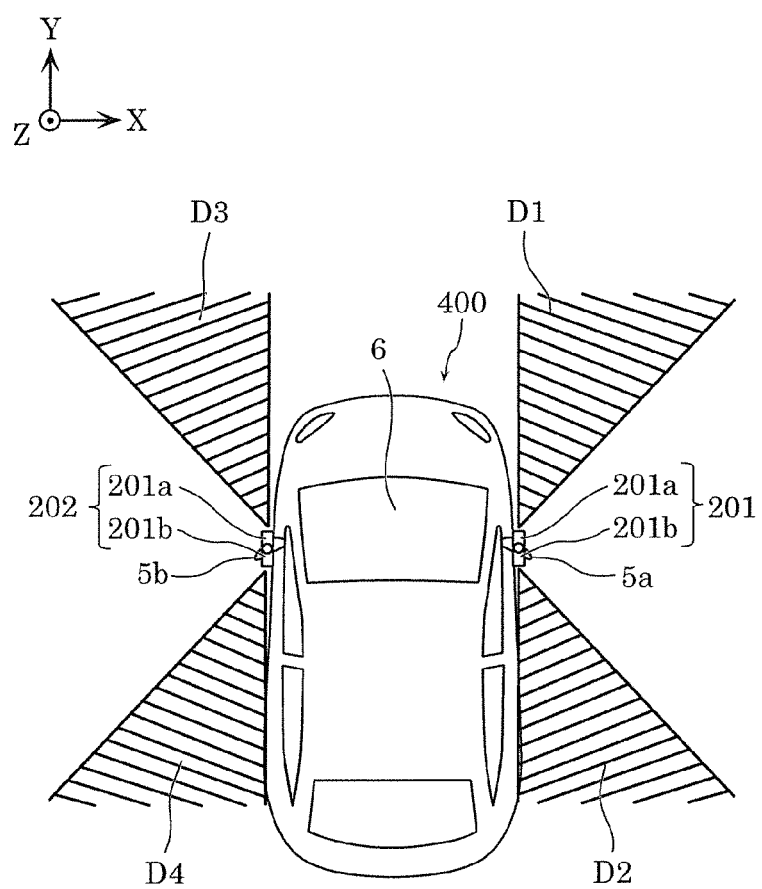
FIG. 1 is a diagram illustrating a vehicle according to an embodiment, which is provided with an in-vehicle lighting device according to the embodiment.
Figure 2A:
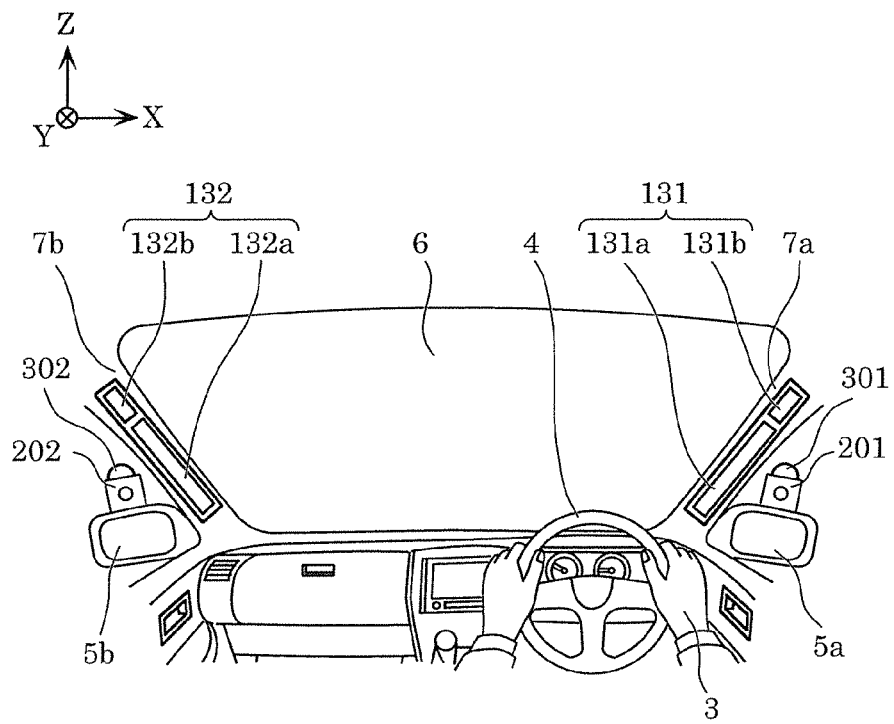
FIG. 2A is a diagram illustrating a view seen from the inside of the vehicle according to the embodiment.
Figure 2B:
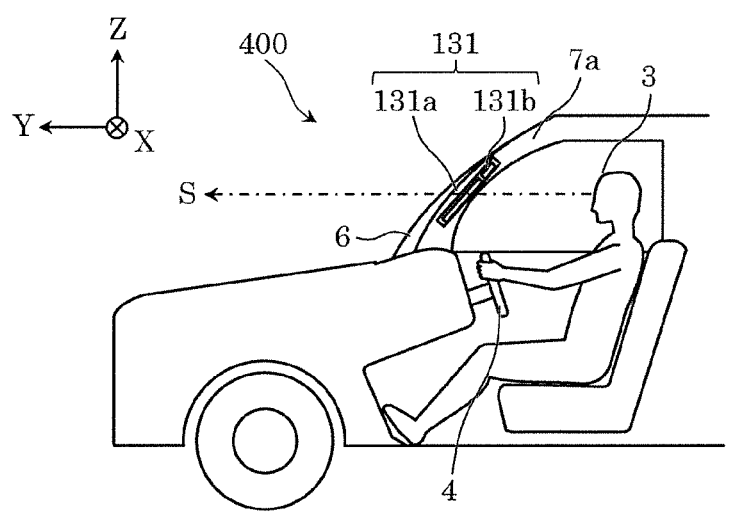
FIG. 2B is a diagram illustrating a view seen from the lateral side of the vehicle according to the embodiment.
Figure 3:
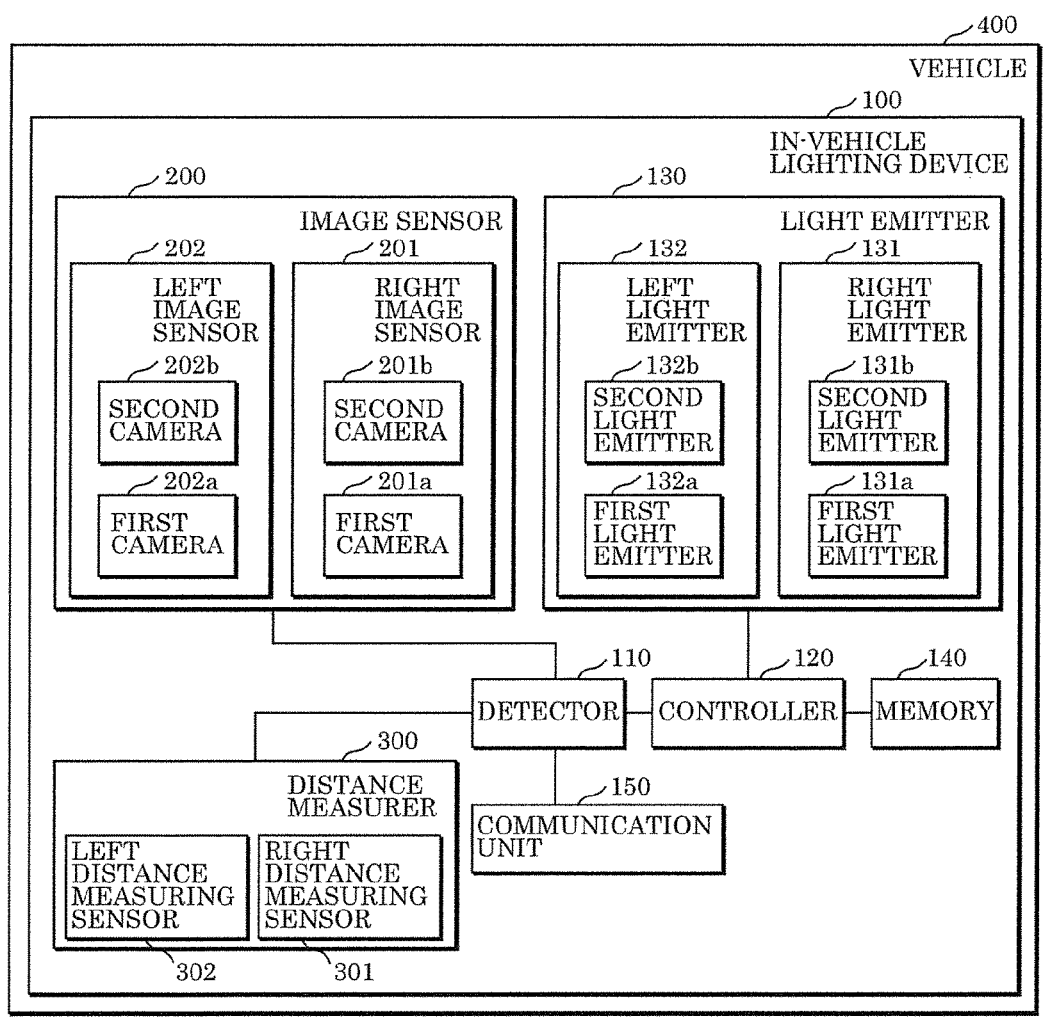
FIG. 3 is a block diagram illustrating a functional configuration that is characteristic of the in-vehicle lighting device according to the embodiment to emit light.

FIG. 1 is a diagram illustrating a vehicle according to an embodiment, which is provided with the in-vehicle lighting device according to the embodiment. FIG. 2A is a diagram illustrating a view seen from the inside of the vehicle according to the embodiment. FIG. 2B is a diagram illustrating a view seen from the lateral side of the vehicle according to the embodiment. FIG. 3 is a block diagram illustrating a functional configuration that is characteristic of in-vehicle lighting device 100 according to the embodiment.

As illustrated in FIGS. 1, 2A, and 2B, pillars 7a and 7b are located on the right and left sides of front window 6 of vehicle 400 including the in-vehicle lighting device according to the present embodiment. In addition, right light emitter 131 being a light source is installed in the surface of the interior side of pillar 7a of vehicle 400 whereas left light emitter 132 being a light source is installed in the surface of the interior side of pillar 7b of vehicle 400. Moreover, side-view mirrors 5a and 5b for checking the rear side views of the vehicle are provided on the left and right sides outside vehicle 400.

In-vehicle lighting device 100 is a lighting device for alerting, by means of light, driver 3 driving vehicle 400 to an obstacle that is present in the vicinity of vehicle 400 equipped with in-vehicle lighting device 100 and that obstructs the driving of vehicle 400. As illustrated in FIG. 3, in-vehicle lighting device 100 includes detector 110, controller 120, light emitter 130, and memory 140.

Detector 110 obtains an image captured by image sensor 200 that captures an image of an area in the vicinity of vehicle 400, and detects the presence/absence of an obstacle. For example, detector 110 processes the images captured at predetermined time intervals by image sensor 200, and extracts a mobile object such as a moving vehicle, motorcycle, bicycle and person. Detector 110 also calculates a distance between a mobile object and vehicle 400 based on, for example, a moving speed of vehicle 400 and the angular change of the mobile object with respect to vehicle 400. In addition, detector 110 extracts, as an obstacle, a mobile object located within a predetermined distance from vehicle 400. Note that the predetermined time intervals for capturing images and the predetermined distance between an obstacle and vehicle 400 are not particularly restricted to those described in the present embodiment, and may be arbitrarily set in advance.

Moreover, detector 110 determines the characteristic of an obstacle that obstructs the driving of vehicle 400. Here, "characteristic of an obstacle" is, for instance, location information of an obstacle. More specifically, the determination of the characteristic of an obstacle is determining whether an obstacle is present in the front or rear area in the vicinity of vehicle 400. Alternatively, "determination of the characteristic of an obstacle" may be the determination of, for example, pedestrian, vehicle and traffic cone in the vicinity of vehicle 400, etc. Alternatively, "determination of the characteristic of an obstacle" may be, for example, determining whether an obstacle is approaching vehicle 400 or whether vehicle 400 is approaching an obstacle.

Detector 110 is realized, for example, by a processor, a microcomputer, or a dedicated circuit. Detector 110 is realized by a central processing unit (CPU) and a control program stored in memory 140, included in in-vehicle lighting device 100, such as a read only memory (ROM), a hard disk drive (HDD), a solid state drive (SSD), etc. In addition, detector 110 may include an interface such as an adapter to be connected to image sensor 200 and distance measurer 300 which will be mentioned later.

Note that detector 110 may obtain information on an area in the vicinity of vehicle 400 (e.g., images) from an external network of vehicle 400 via communication unit 150 being a communication interface. Detector 110 may obtain an image, via communication unit 150 from a camera or the like which captures an image of a roadway on which vehicle 400 is traveling, and may detect an obstacle present in the vicinity of vehicle 400 by analyzing the image.

In the present embodiment, image sensor 200 (right image sensor 201 and left image sensor 202, to be specific) is provided in side-view mirrors 5a and 5b for driver 3 to check the rear-side views of vehicle 400. Right image sensor 201 includes first camera 201a for capturing an image of the front area in the vicinity of vehicle 400 and second camera 201b for capturing an image of the rear area in the vicinity of vehicle 400 while left image sensor 202 includes first camera 202a and second camera 202b, respectively. Detector 110 detects an obstacle present in the vicinity of vehicle 400 by analyzing an image captured by image sensor 200. Note that the location for installing image sensor 200 in vehicle 400 shall not be particularly restricted to side-view mirror 5 of vehicle 400. For example, image sensor 200 may be installed inside a headlight of vehicle 400.

Image sensor 202 is a camera for capturing an image of an area in the vicinity of vehicle 400. Image sensor 200 may be, for example, a camera using a complementary metal oxide semiconductor (CMOS) image sensor or a charge coupled device (CCD) image sensor.

First camera 201a captures, for example, an image of image capture area D1 that can easily become a blind spot of driver 3 due to pillar 7a. Second camera 201b captures, for example, an image of image capture area D2 that can easily become a blind spot of driver 3 due to a pillar located in the right rear part of the vehicle. First camera 202a captures, for example, an image of image capture area D3 that can easily become a blind spot of driver 3 due to pillar 7b. Second camera 202b captures, for example, an image of image capture area D4 that can easily become a blind spot of driver 3 due to a pillar located in the left rear part of the vehicle.

Controller 120 is a control device that is electrically connected to light emitter 130 and controls light emission by light emitter 130. When detector 110 detects an obstacle present in the vicinity of vehicle 400, controller 120 causes light emitter 130 to emit light having a color according to the characteristic of the detected obstacle.

For example, when detector 110 detects an obstacle in a front area in the vicinity of vehicle 400, controller 120 controls light emitter 130 to emit light having a red color, and when detector 110 detects an obstacle in a rear area in the vicinity of vehicle 400, controller 120 controls light emitter 130 to emit light having a yellow color. Alternatively, when detector 110 detects a pedestrian as an obstacle, controller 120 controls light emitter 130 to emit light having a red color. When detector 110 detects, as an obstacle, a vehicle such as a motorcycle, controller 120 controls light emitter 130 to emit light having a yellow color.

Controller 120 is realized, for example, by a CPU and a control program that is stored in memory 140.

Note that detector 110 and controller 120 may be realized by a single processor, microcomputer, or dedicated circuit which has the functions of both detector 110 and controller 120, or may be realized by a combination of two or more among a processor, a microcomputer, and a dedicated circuit.

Light emitter 130 is a light source installed in the interior side of the pillar located in the front part of vehicle 400. Light emitter 130 is capable of emitting light of different colors. For example, light emitter 130 is capable of emitting light having a red, yellow, or green color which is a chromatic color. Light emitter 130 is a lighting device that informs driver 3 of the characteristic of an obstacle by the color of light. Therefore, light emitter 130 may emit light having a red or orange color representing danger, or a yellow color representing caution. For example, light emitter 130 may emit light having a red color or the like representing danger when vehicle 400 has to urgently stop, and may emit light having a green color or the like when no such urgency is required such that vehicle 400 is caused to stop immediately. In addition, when detector 110 does not detect any obstacles in the vicinity of vehicle 400, controller 120 may control light emitter 130 so as not to emit light. For example, light emitter 130 may further has a light source emitting a white light and controller 120 may control light emitter 130 to emit light having a white color.

The configuration of light emitter 130 is not particularly restricted, but is, for example, a light-emitting diode (LED), an organic electro luminescence (EL) light-emitting diode, etc. Alternatively, light emitter 130 may be a display which emits light, such as a liquid crystal display or an organic EL display. Thus, in the case where light emitter 130 is a display, light emitter 130 may display characters or symbols according to the characteristic of an obstacle. In the present embodiment, light emitter 130 is a vertical cavity surface emitting light source. Moreover, light emitter 130 (more specifically, right light emitter 131 and left light emitter 132) is installed in both pillars 7a and 7b, as illustrated in FIG. 2A in the present embodiment.

Note that, when light emitter 130 emits light, the light emitted by light emitter 130 needs to be visible for driver 3. Therefore, light emitter 130 may be disposed, for example, in such a manner to be covered by the wall paper of pillars 7a and 7b.

Moreover, light emitter 130 includes two light emitters that are spatially positioned one above the other. More specifically, right light emitter 131 includes, for example, first light emitter 131a and second light emitter 131b positioned above first light emitter 131a, as illustrated in FIGS. 2A and 2B.

Controller 120 causes at least one of first light emitter 131a and second light emitter 131b according to the characteristic of an obstacle detected by detector 110.

Note that, in the present embodiment, left light emitter 132, like right light emitter 131, also includes first light emitter 132a and second light emitter 132b positioned above first light emitter 132a. Moreover, controller 120 may cause first light emitters 131a and 132a to emit light in a similar mode, according to the characteristic of an obstacle, but in the present embodiment, detector 110 determines whether an obstacle is present in either right or left direction in the vicinity of vehicle 400 and causes right light emitter 131 or left light emitter 132 to emit light according to the right or left direction determined.

Moreover, when detector 110 detects an obstacle present in the front area in the vicinity of vehicle 400, controller 120 causes one of first light emitters 131a, 132a and second light emitters 131b, 132b to emit light, and when detector 110 detects an obstacle present in the rear area in the vicinity of vehicle 400, controller 120 causes the other of first light emitters 131a, 132a and second light emitters 131b, 132b to emit light. Note that when detector 110 detects obstacles that are respectively present in the front and rear areas in the vicinity of vehicle 400, controller 120 causes both first light emitters 131a, 132a and second light emitters 131b, 132b to emit light.

Moreover, one of first light emitters 131a, 132a and second light emitters 131b, 132b, which emit light when detector 110 detects an obstacle present in the front area in the vicinity of vehicle 400, may have a larger light emitting area than the other of first light emitters 131a, 132a and second light emitters 131b, 132b which emit light when detector 110 detects an obstacle present in the rear area in the vicinity of vehicle 400. More precisely, the light emitter which emits light when detector 110 detects an obstacle in the front area in the vicinity of vehicle 400 may be larger than the light emitter which emits light when detector 110 detects an obstacle in the rear area in the vicinity of vehicle 400.

In the present embodiment, when detector 110 detects an obstacle present in the front area in the vicinity of vehicle 400, controller 120 causes first light emitters 131a and 132a to emit light, and when detector 110 detects an obstacle present in the rear area in the vicinity of vehicle 400, controller 120 causes second light emitters 131b and 132b to emit light. Stated differently, first light emitters 131a and 132a may have a larger light emitting area than second light emitters 131b and 132b. Moreover, in this case, first light emitter 131a may be disposed at the height in viewing direction S (along the length of Z-axis direction in the present embodiment) of driver 3 driving vehicle 400, and second light emitter 131b may be disposed above it. Note that viewing direction S is a direction in which vehicle 400 moves forward and is a direction that is parallel to the Y-axis and is on the side of a Y-axis positive direction. Pillars 7a and 7b located in the front part of vehicle 400 respectively have a form extending in a direction opposite to the traveling direction of vehicle 400 along front window 6, as their positions get higher. More specifically, pillar 7a has a form extending from the Y-axis positive direction side toward the Y-axis negative direction side as it extends from the Z-axis negative direction side toward the Z-axis positive direction side. Therefore, the locations of first light emitters 131a and 132a that are at the height in viewing direction S and the locations of second light emitters 131b and 132b that are above first light emitters 131a and 132a allow driver 3 to easily and intuitively know, when first light emitters 131a, 132a and second light emitters 131b, 132b emit light, which of first light emitters 131a, 132a and second light emitters 131b, 132b correspond to the front side of vehicle 400 and which of first light emitters 131a, 132a and second light emitters 131b, 132b correspond to the rear side of vehicle 400, respectively.

Moreover, first light emitters 131a and 132a may emit light having a color different from the color of light emitted by second light emitters 131b and 132b. For example, controller 120 may cause first light emitters 131a and 132a to emit light having a red color when detector 110 detects a pedestrian in the front area in the vicinity of vehicle 400, and cause second light emitters 131b and 132b to emit light having a yellow color when detector 110 detects a pedestrian in the rear area in the vicinity of vehicle 400.

Moreover, light emitter 130 may have a long shape in accordance with the shape of pillar. More specifically, right light emitter 131 and left light emitter 132 respectively have a long shape extending along pillar 7a or pillar 7b.

Furthermore, in-vehicle light emitting device 100 includes distance measurer 300 for measuring a distance between vehicle 400 and an obstacle. Stated differently, detector 110 may detect a distance between vehicle 400 and an obstacle, as an example of the characteristic of obstacle. Detector 110 may calculate the distance between vehicle 400 and an obstacle by analyzing an image obtained from image sensor 200, but with distance measurer 300, it is possible to measure the distance between vehicle 400 and an obstacle with more ease than by the image analysis.

In the present embodiment, distance measurer 300 includes right distance measuring sensor 301 and left distance measuring sensor 302. Right distance measuring sensor 301 is attached to right image sensor 201 whereas left distance measuring sensor 302 is attached to left image sensor 202. Note that the location for installing distance measurer 300 in vehicle 400 and the number of distance measuring sensors included in distance measurer 300 shall not be specifically restricted. For example, distance measurer 300 may be installed inside the headlight of vehicle 400. The configuration of distance measurer 300 shall not be specifically restricted to the one that has been described above, and may be, for example, an infrared light camera composed of a light source that emits infrared light and a camera that receives the infrared light, an electromagnetic sensor, or a distance measuring sensor using visible light.

For example, controller 120 changes the luminance of light emitted by emitter 130 according to a distance between vehicle 400 and an obstacle. More specifically, when the distance is a predetermined distance or greater, controller 120 causes light emitter 130 to emit light with a low luminance, and when the distance is less than the predetermined distance, controller 120 causes light emitter 130 to emit light with a high luminance. The predetermined distance shall not be specifically restricted and may be set arbitrarily, e.g., 10, 50, or 100 meters. In addition, plural distances may be set for the predetermined distance so that luminance may be changed according to the respective predetermined distances. Moreover, controller 120 may cause light emitter 130 to emit light in such a manner that the luminance gradually changes according to the distance between 0 to 100 meters.

Moreover, in-vehicle lighting device 100 further includes memory 140 and communication unit 150.

Memory 140 is a storage device in which a control program executed by both detector 110 and controller 120 is stored. Memory 140 is configured by a memory, such as a ROM, RAM, HDD, and SSD.

Communication unit 150 is a communication interface for detector 110 to obtain information on an area in the vicinity of vehicle 400 from an external network. In addition, detector 110 obtains, via communication unit 150, information indicating whether or not the engine of vehicle 400 is started, information on the steering angle of handle 4 (i.e., steering of vehicle 400), etc. from, for example, an engine control unit (ECU) provided in vehicle 400.

[Operation of In-Vehicle Lighting Device]

Subsequently, basic operations executed by controller 120 to cause light emitter 130 to emit light in a mode according to the characteristic of an obstacle in the vicinity of vehicle 400 will be described with reference to FIG. 4.

Figure 4:
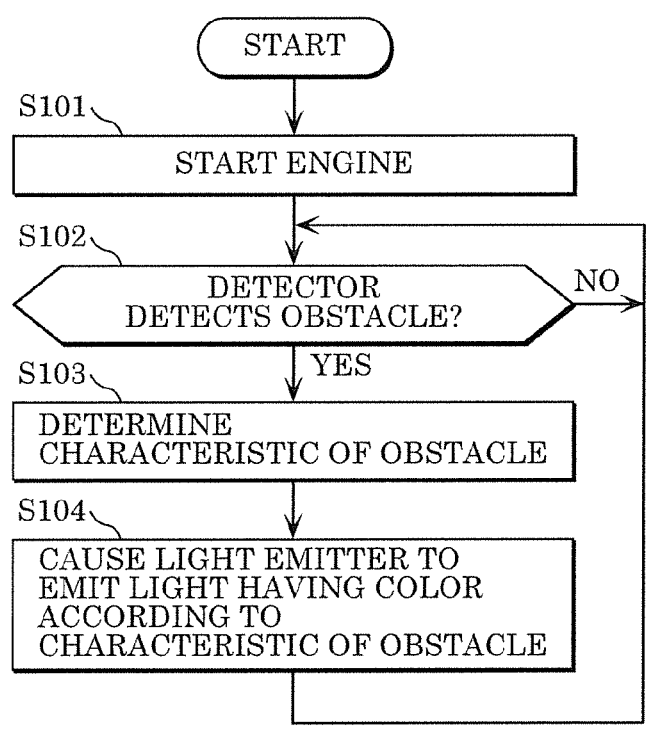
FIG. 4 is a flowchart illustrating an operational procedure for causing a light emitter of the in-vehicle lighting device according to the embodiment to emit light.

FIG. 4 is a flowchart illustrating an operational procedure for causing light emitter 130 of in-vehicle lighting device 100 according to the embodiment to emit light.

Driver 3 starts the engine (not shown in the diagram) of vehicle 400 (step S101).

Then, in step S101, controller 120 activates image sensor 200. Controller 120 activates image sensor 200 when detector 110 obtains, via communication unit 150, a signal indicating that the engine of vehicle 400 has been activated, for example, from the ECU provided in vehicle 400 but not shown in the diagram, and detects the signal.

Next, detector 110 detects whether or not an obstacle that obstructs the driving of vehicle 400 is present in the vicinity of vehicle 400 (step S102).

When having determined that no such obstacle is present in the vicinity of vehicle 400 (No in step S102), detector 110 continues detecting whether or not an obstacle is present in the vicinity of vehicle 400.

On the contrary, when having detected, in the vicinity of vehicle 400, an obstacle that obstructs the driving of vehicle 400 (Yes in step S102), detector 110 determines the characteristic of the obstacle (step S103).

Next, controller 120 causes light emitter 130 to emit light in a mode according to the characteristic of the obstacle detected by detector 110 (step S104).

Detector 110 and controller 120 continue the operation from step S102 to step S104 above. For example, detector 110 and controller 120 end the operation when driver 3 stops the engine of vehicle 400.

Subsequently, the operation executed by controller 120 to cause light emitter 130 to emit light in a mode according to the characteristic of an obstacle in the vicinity of vehicle 400 will be described with reference to FIGS. 5 to 10B.

Note that the cross-hatched part of light emitter 130 illustrated in each of FIGS. 6B, 7B, 9B, and 10B does not illustrate the cross section of light emitter 130, but presents that light emitter 130 is turned on.

Figure 5:
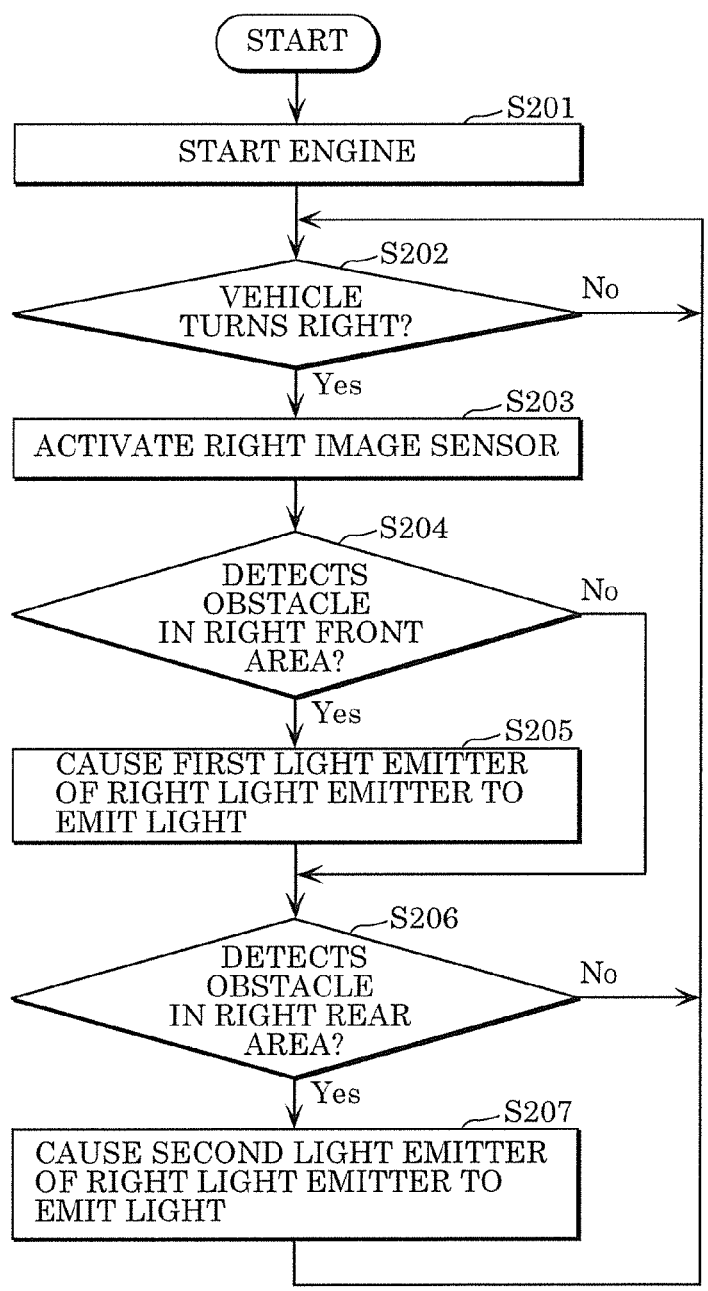
FIG. 5 is a flowchart illustrating an example of the operational procedure for causing a right light emitter of the in-vehicle lighting device according to the embodiment to emit light.

FIG. 5 is a flowchart illustrating an example of the operational procedure for causing right light emitter 131 of in-vehicle lighting device 100 according to the embodiment to emit light.

Driver 3 starts the engine of vehicle 400 (step S201).

Next, detector 110 detects whether or not vehicle 400 turns right (step S202). For example, detector 110 obtains, from the ECU via communication unit 150, information on the steering angle of handle 4 (i.e., steering of vehicle 400), and determines whether or not vehicle 400 turns right.

When having determined that vehicle 400 does not turn right (No in step S202), detector 110 continues detecting whether or not vehicle 400 turns right.

On the contrary, when having determined that vehicle 400 turns right (Yes in step S202), detector 110 activates right image sensor 201 of image sensor 200 (step S203). Thus, detector 110 may activate either right image sensor 201 or left image sensor 202 based on the steering angle of handle 4 of vehicle 400.

Next, detector 110 obtains an image of the right front area in the vicinity of vehicle 400 from first camera 201a, and detects an obstacle in the obtained image (step S204).

When detector 110 detects an obstacle in the right front area in the vicinity of vehicle 400 (Yes in step S204), controller 120 causes first light emitter 131a of right light emitter 131 to emit light in a predetermined mode (step S205). For example, controller 120 causes first light emitter 131a of right light emitter 131 to emit light having a red color, in step S205.

When detector 110 does not detect any obstacles in the right front area in the vicinity of vehicle 400 (No in step S204) or controller 120 causes first light emitter 131a of right light emitter 131 to emit light in the predetermined mode, detector 110 obtains an image of the right rear area in the vicinity of vehicle 400 from second camera 201b and detects an obstacle in the obtained image (step S206).

When detector 110 detects an obstacle in the right rear area in the vicinity of vehicle 400 (Yes in step S206), controller 120 causes second light emitter 131b of right light emitter 131 to emit light in a predetermined mode (step S207). For example, controller 120 causes second light emitter 131b of right light emitter 131 to emit light having a yellow color, in step S207.

When detector 110 does not detect any obstacles in the right rear area in the vicinity of vehicle 400 (No in step S206) or controller 120 causes second light emitter 131b of right light emitter 131 to emit light in a predetermined mode, detector 110 and controller 120 return to step S202 and repeat the operation from step S202 to step S207.

Figure 6A:
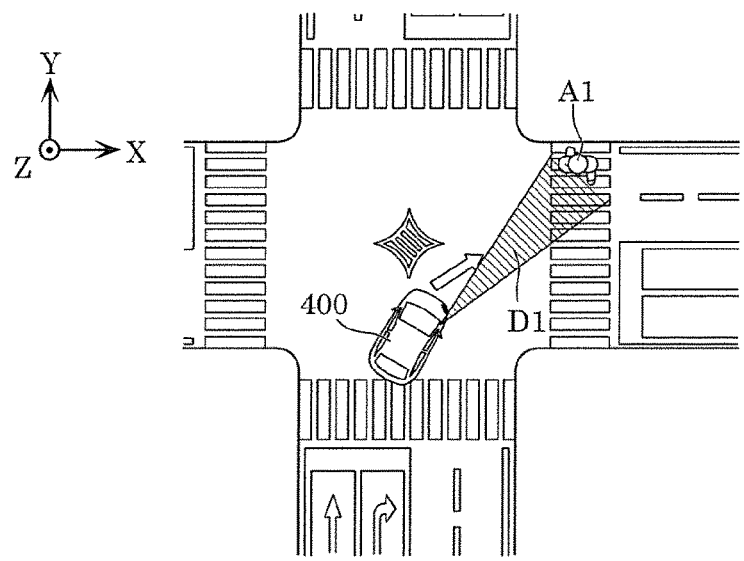
FIG. 6A is a diagram for explaining an example of the traveling state of the vehicle according to the embodiment when the vehicle turns right.
Figure 6B:
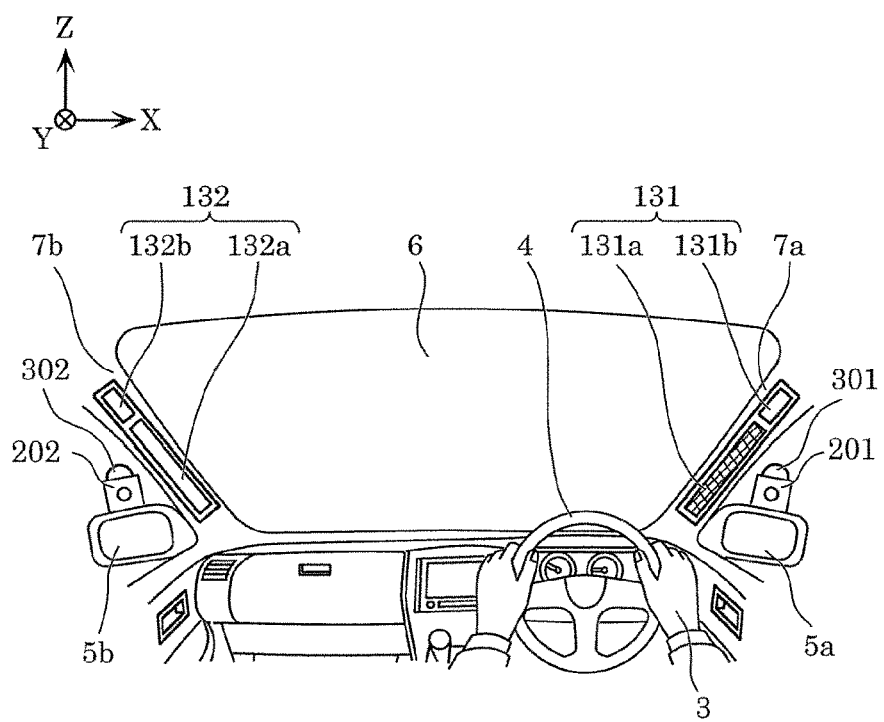
FIG. 6B is a diagram illustrating an example of the state of light emission by the light emitter included in the in-vehicle lighting device according to the embodiment, when the vehicle turns right.

FIG. 6A is a diagram for explaining an example of the traveling state of vehicle 400 according to the embodiment when vehicle 400 turns right. FIG. 6B is a diagram illustrating an example of the light emission by light emitter 130 included in in-vehicle lighting device 100 when vehicle 400 according to the embodiment turns right.

As illustrated in FIG. 6A, when vehicle 400 attempts to turn right at the intersection, for example, detector 110 activates right image sensor 201 and detects whether or not an obstacle is present in image capture area D1. In FIG. 6A, it is assumed that a pedestrian walking across a pedestrian crossing is detected as obstacle A1. In this case, controller 120 alerts driver 3 to the presence of the obstacle in the traveling direction of vehicle 400 by causing first light emitter 131a of right light emitter 131 to emit light, as illustrated in FIG. 6B.

Figure 7A:
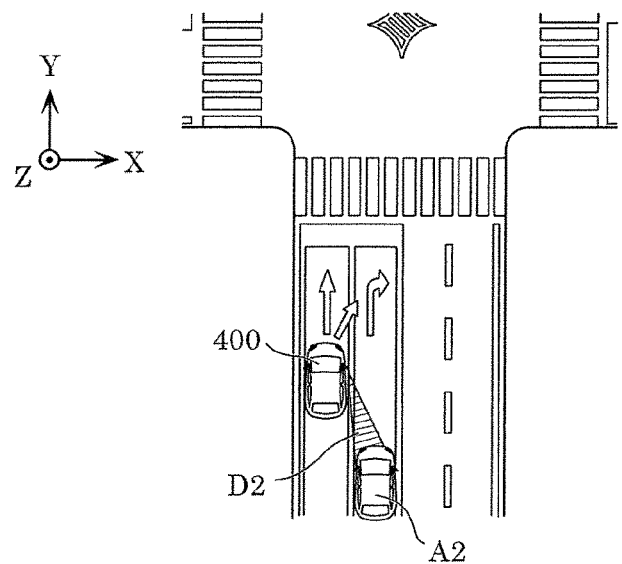
FIG. 7A is a diagram for explaining another example of the traveling state of the vehicle according to the embodiment when the vehicle turns right.
Figure 7B:
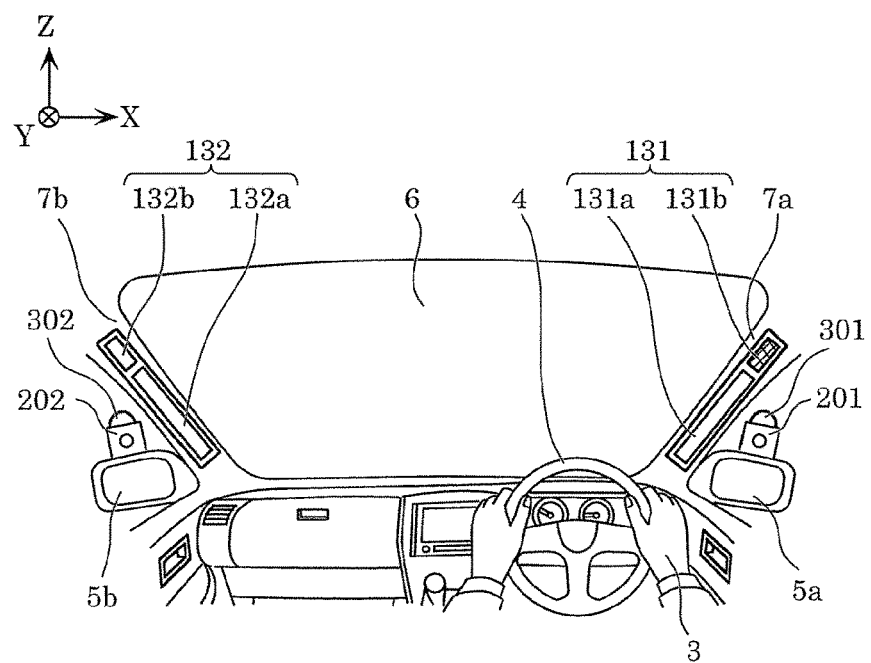
FIG. 7B is a diagram illustrating another example of the state of light emission by the light emitter included in the in-vehicle lighting device, when the vehicle according to the embodiment turns right.

FIG. 7A is a diagram for explaining another example of the traveling state of vehicle 400 according to the embodiment when vehicle 400 turns right. FIG. 7B is a diagram illustrating another example of the light emission by light emitter 130 included in in-vehicle lighting device 100 when vehicle 400 according to the embodiment turns right.

As illustrated in FIG. 7A, when vehicle 400 attempts to change the driving lane to the right lane, for example, detector 110 activates right image sensor 201 and detects whether or not an obstacle is present in image capture area D2. In FIG. 7A, it is assumed that a vehicle driving in the right lane is detected as obstacle A2. In this case, controller 120 alerts driver 3 that an obstacle is present in the traveling direction of vehicle 400 by causing second light emitter 131b of right light emitter 131 to emit light, as illustrated in FIG. 7B.

Stated differently, according to the present embodiment, when an obstacle is present in the front area at the time when vehicle 400 turns right, controller 120 causes right light emitter 131 (first light emitter 131a in the present embodiment), which is located in the interior side of right pillar 7a that normally creates a blind spot, to emit light having a red color, and this calls for the attention of driver 3. Therefore, driver 3 changes the direction of eyes in such a manner to avoid pillar 7a and can thereby identify the obstacle in the right front area of vehicle 400, and this enhances traffic safety.

Moreover, in the present embodiment, when an obstacle is present in the right rear area of vehicle 400 at the time when vehicle 400 turns right, controller 120 causes right light emitter 131 to emit light having a yellow color and this calls for the attention of driver 3. Since driver 3 visually confirms the right rear area using side-view mirror 5a in many cases, by providing second light emitter 131b in pillar 7a near side-view mirror 5a, the driver easily notices that second light emitter 131b is turned on and this enhances traffic safety.

Figure 8:
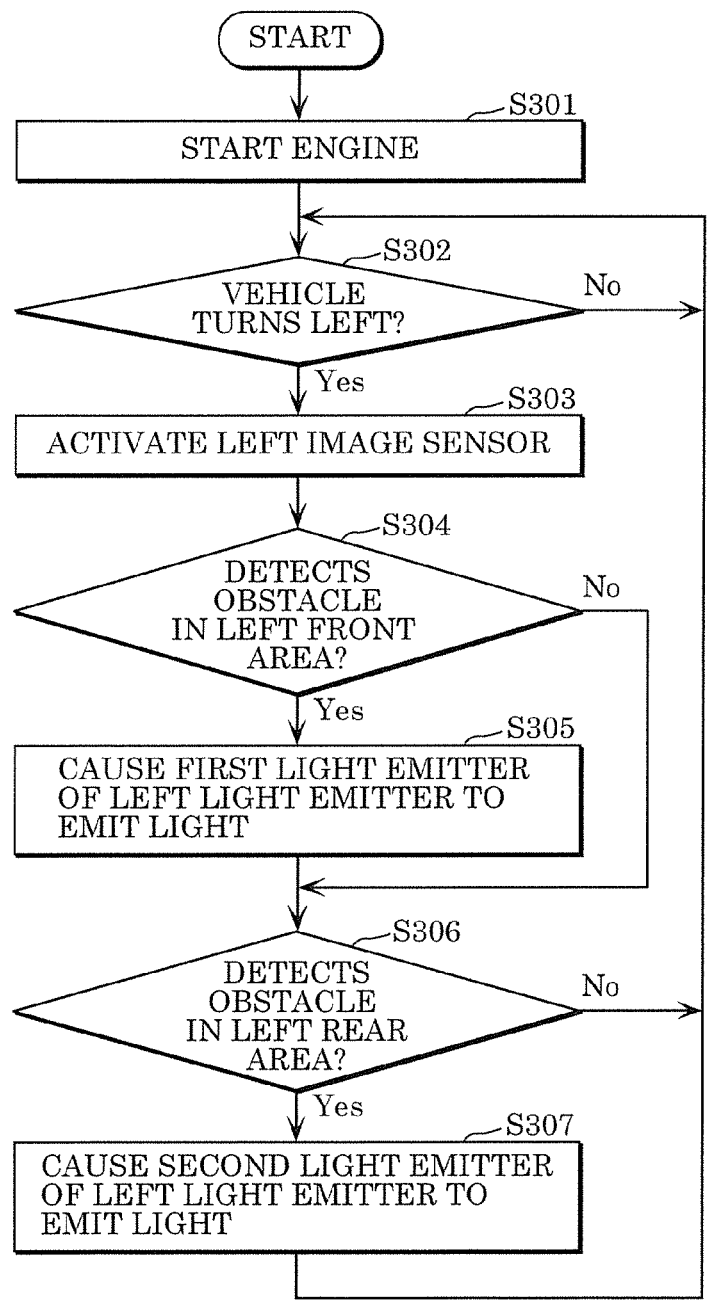
FIG. 8 is a flowchart illustrating an example of the operational procedure for causing a left light emitter of the in-vehicle lighting device according to the embodiment to emit light.

FIG. 8 is a flowchart illustrating an example of the operational procedure for causing left light emitter 132 of in-vehicle lighting device 100 according to the embodiment to emit light.

Driver 3 starts the engine of vehicle 400 (step S301).

Next, detector 110 detects whether or not vehicle 400 turns left (step S302). For example, detector 110 obtains, from the ECU via communication unit 150, the information on the steering angle of handle 4 (i.e., steering of vehicle 400), and determines whether or not vehicle 400 turns left.

When having determined that vehicle 400 does not turn left (No in step S302), detector 110 continues detecting whether or not vehicle 400 turns left.

On the contrary, when having determined that vehicle 400 turns left (Yes in step S302), detector 110 activates left image sensor 202 of image sensor 200 (step S303).

Next, detector 110 obtains an image of the left front area in the vicinity of vehicle 400 from first camera 202a, and detects an obstacle in the obtained image (step S304).

When detector 110 detects an obstacle in the left front area in the vicinity of vehicle 400 (Yes in step S304), controller 120 causes first light emitter 132a of left light emitter 132 to emit light in a predetermined mode (step S305). For example, controller 120 causes first light emitter 132a of left light emitter 132 to emit light having a red color, in step S305.

When detector 110 does not detect any obstacles in the left front area in the vicinity of vehicle 400 (No in step S304) or after controller 120 causes first light emitter 132a of left light emitter 132 to emit light in a predetermined mode, detector 110 obtains, from second camera 202b, an image of the left rear area in the vicinity of vehicle 400, and detects an obstacle in the obtained image (step S306).

When detector 110 detects an obstacle in the left rear area in the vicinity of vehicle 400 (Yes in step S306), controller 120 causes second light emitter 132b of left light emitter 132 to emit light in a predetermined mode (step S307). For example, controller 120 causes second light emitter 132b of left light emitter 132 to emit light having a yellow color, in step S307.

When detector 110 does not detect any obstacles in the left rear area in the vicinity of vehicle 400 (No in step S306) or after controller 120 causes second light emitter 132b of left light emitter 132 to emit light in a predetermined mode, detector 110 and controller 120 return to step S302 and repeat the operation from step S302 to step S307.

Figure 9A:
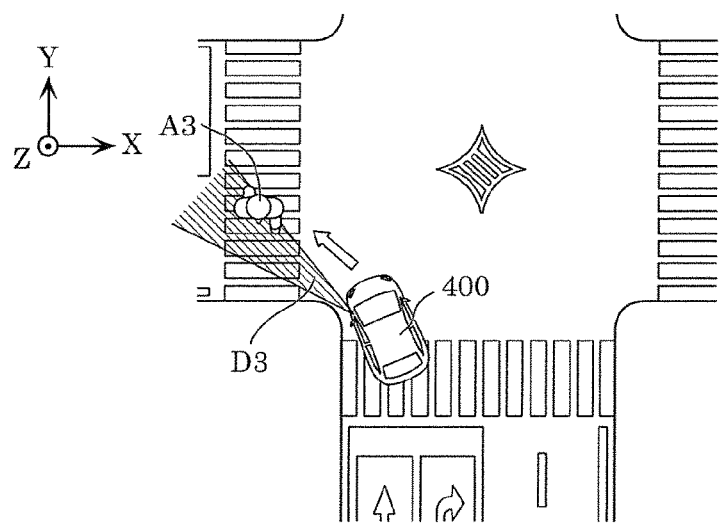
FIG. 9A is a diagram for explaining an example of the traveling state of the vehicle according to the embodiment when the vehicle turns left.
Figure 9B:
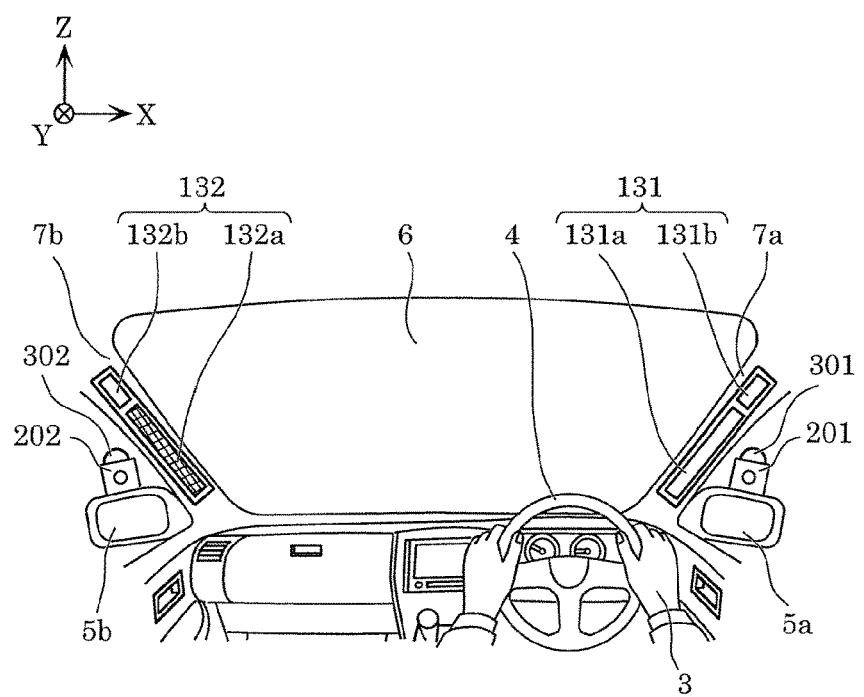
FIG. 9B is a diagram illustrating an example of the state where the light emitter included in the in-vehicle lighting device is turned on when the vehicle according to the embodiment turns left.

FIG. 9A is a diagram for explaining an example of the traveling state of vehicle 400 according to the embodiment when vehicle 400 turns left. FIG. 9B is a diagram illustrating an example of the light emission by light emitter 130 included in in-vehicle lighting device 100 when vehicle 400 according to the embodiment turns left.

As illustrated in FIG. 9A, when vehicle 400 attempts to turn left at the intersection, for example, detector 110 activates left image sensor 202 and detects whether or not an obstacle is present in image capture area D3. In FIG. 9A, it is assumed that a pedestrian walking across a pedestrian crossing is detected as obstacle A3. In this case, controller 120 alerts driver 3 that an obstacle is present in the traveling direction of vehicle 400 by causing first light emitter 132a of right light emitter 132 to emit light, as illustrated in FIG. 9B.

Figure 10A:
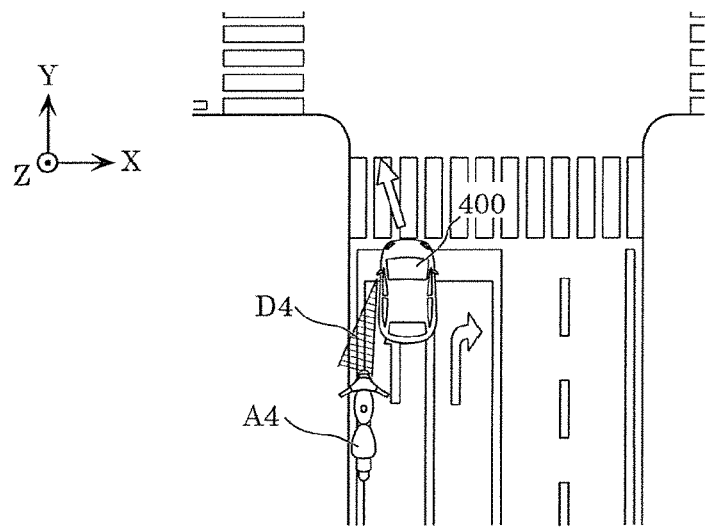
FIG. 10A is a diagram for explaining another example of the traveling state of the vehicle according to the embodiment when the vehicle turns left.
Figure 10B:
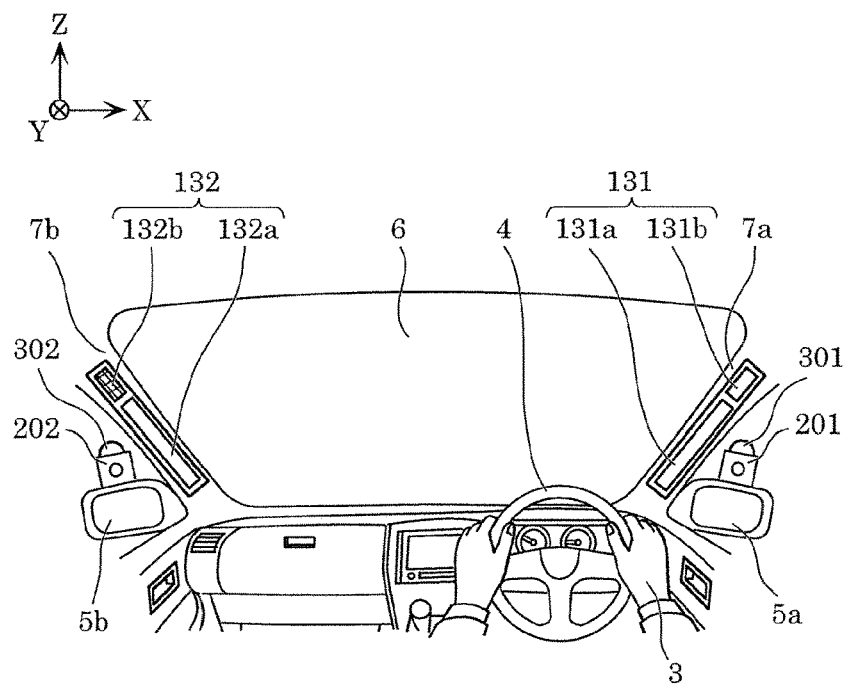
FIG. 10B is a diagram illustrating another example of the state where the light emitter included in the in-vehicle lighting device is turned on when the vehicle according to the embodiment turns left.

FIG. 10A is a diagram for explaining another example of the traveling state of vehicle 400 according to the embodiment when vehicle 400 turns left. FIG. 10B is a diagram illustrating another example of the light emission by light emitter 130 included in in-vehicle lighting device 100 when vehicle 400 according to the embodiment turns left.

As illustrated in FIG. 10A, when vehicle 400 attempts to turn left at the intersection, for example, detector 110 activates left image sensor 202 and detects whether or not an obstacle is present in image capture area D4. In FIG. 10A, it is assumed that a motorcycle trying to overtake vehicle 400 from left is detected as obstacle A4. In this case, controller 120 alerts driver 3 that an obstacle is present in the traveling direction of vehicle 400 by causing second light emitter 132b of left light emitter 132 to emit light, as illustrated in FIG. 10B.

Stated differently, according to the present embodiment, when an obstacle is present in the front area at the time when vehicle 400 turns left, controller 120 causes left light emitter 132 (first light emitter 132a in the present embodiment), which is located in the interior side of left pillar 7b that normally creates a blind spot, to emit light having a red color, and this calls for the attention of driver 3, as is the case where vehicle 400 turns right. Therefore, driver 3 changes the direction of eyes in such a manner to avoid pillar 7b and can thereby identify the obstacle in the left front area of vehicle 400, and this enhances traffic safety.

Moreover, in the present embodiment, when an obstacle is present in the left rear area of vehicle 400 at the time when vehicle 400 turns left, controller 120 causes left light emitter 132 to emit light having a yellow color and this calls for the attention of driver 3. Since driver 3 visually confirms the left rear area using side-view mirror 5b in many cases, by providing second light emitter 132b on pillar 7b located near side-view mirror 5b, the driver easily notices that second light emitter 132b is turned on and this enhances traffic safety.

As has been described above, controller 120 causes light emitter 130 to emit light having a color according to the characteristic of the obstacle detected by detector 110, based on the characteristic of the obstacle.

Controller 120 may further cause light emitter 130 to change the mode of light emission according to a distance between vehicle 400 and an obstacle.

Figure 11:
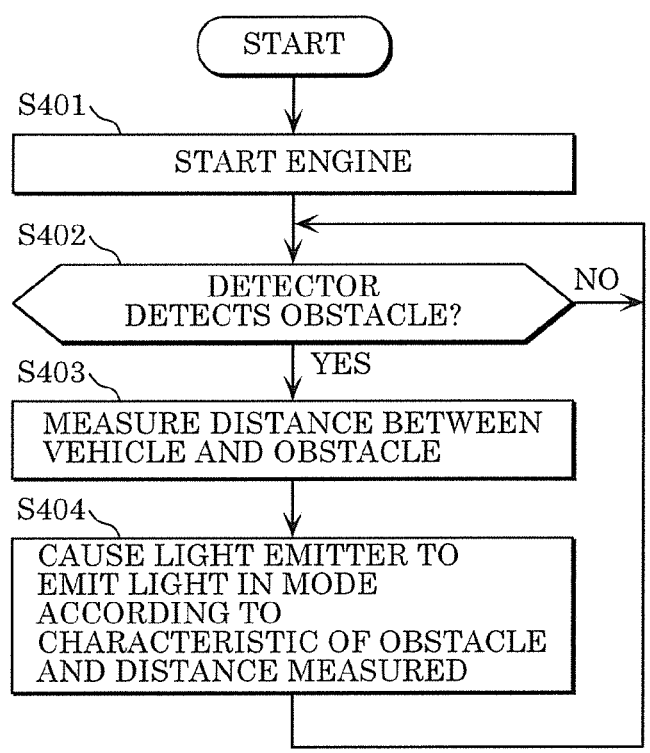
FIG. 11 is a flowchart for explaining an operation for the in-vehicle lighting device according to the embodiment to cause the light emitter to emit light in a mode according to a distance between the vehicle according to the embodiment and an obstacle in the vicinity of the vehicle.

FIG. 11 is a flowchart for explaining an operation for the in-vehicle lighting device 100 according to the embodiment to cause light emitter 130 to emit light in a mode according to the distance between vehicle 400 and an obstacle in the vicinity of vehicle 400.

As illustrated in FIG. 11, driver 3 activates the engine of vehicle 400 and causes vehicle 400 to start (step S401).

Next, detector 110 detects whether or not an obstacle that obstructs the driving of vehicle 400 is present in the vicinity of vehicle 400 (step S402). Controller 120 activates image sensor 200 when detector 110 obtains, via communication unit 150, a signal indicating that the engine of vehicle 400 has been activated, for example, from the ECU provided in vehicle 400 but not shown in the diagram, and detects the signal.

When having determined that no such obstacle is present in the vicinity of vehicle 400 (No in step S402), detector 110 continues detecting whether or not an obstacle is present in the vicinity of vehicle 400.

On the contrary, when detector 110 detects an obstacle that obstructs the driving of vehicle 400 (Yes in step S402), controller 120 obtains a distance between vehicle 400 and the obstacle from distance measurer 300 (step S403).

Controller 120 causes light emitter 130 to emit light in a mode according to the characteristic of the obstacle obtained by detector 110 from image sensor 200 and the distance obtained by detector 110 from distance measurer 300 (step S404).

For example, controller 120 changes the luminance of light emitted by emitter 130 according to a distance between vehicle 400 and an obstacle. More specifically, when the distance is a predetermined distance or greater, controller 120 causes light emitter 130 to emit light with a low luminance, and when the distance is less than the predetermined distance, controller 120 causes light emitter 130 to emit light with a high luminance. The predetermined distance shall not be specifically restricted and may be set arbitrarily, e.g., 10, 50, or 100 meters. In addition, plural distances may be set for the predetermined distance so that luminance may be changed according to the respective predetermined distances. Moreover, controller 120 may cause light emitter 130 to emit light in such a manner that the luminance gradually changes according to the distance between 0 to 100 meters.

For example, controller 120 may cause light emitter 130 to flash according to a distance between vehicle 400 and an obstacle. More specifically, when the distance is a predetermined distance or greater, controller 120 causes light emitter 130 to flash in a long cycle, and when the distance is less than the predetermined distance, controller 120 causes light emitter 130 to emit light in a short cycle.

For example, controller 120 may cause light emitter 130 to change the color of light according to a distance between vehicle 400 and an obstacle. More specifically, when the distance is a predetermined distance or greater, controller 120 causes light emitter 130 to flash light having a yellow color, and when the distance is less than the predetermined distance, controller 120 causes light emitter 130 to flash light having a red color.

Moreover, controller 120 may cause first light emitters 131a and 132a to emit light in a mode different from a mode in which second light emitters 131b and 132b emit light, according to a distance between vehicle 400 and an obstacle.

Detector 110 and controller 120 continue the operation from step S402 to step S404 above. For example, detector 110 and controller 120 end the operation when driver 3 stops the engine of vehicle 400.

Effects

In-vehicle lighting device 100 according to the embodiment is an in-vehicle lighting device for alerting driver 3 driving vehicle 400 to an obstacle present in the vicinity of vehicle 400, which obstructs the driving of vehicle 400. In-vehicle lighting device 100 is installed in the interior side of pillars 7a and 7b located in the front part of vehicle 400, and includes: light emitter 130 capable of emitting light of different colors; controller 120 connected to light emitter 130; and detector 110 that is connected to controller 120 and detects an obstacle present in the vicinity of vehicle 400. When detector 110 detects an obstacle present in the vicinity of vehicle 400, controller 120 causes light emitter 130 to emit light having a color according to the characteristic of the detected obstacle.

According to such a configuration, it is possible to notify driver 3 of the information on an obstacle.

Moreover, light emitter 130 is installed in pillars 7a and 7b. Pillars 7a and 7b easily create blind spots for driver 3 at the time of driving vehicle 400. Stated differently, pillars 7a and 7b easily come into the field vision of driver 3 at the time of driving vehicle 400, particularly when vehicle 400 turns right or left, which is the occasion when danger is likely to occur during the driving of vehicle 400. For this reason, according to in-vehicle lighting device 100, light emitter 130 is installed in respective pillars 7a and 7b, and driver 3 is notified of the information on an obstacle by the color of light. Thus, driver 3 can intuitively determine whether or not an obstacle is present. Therefore, according to the configuration of in-vehicle lighting device 100, safety driving can be further enhanced.

Moreover, light emitter 130 may include first light emitters 131a, 132a and second light emitters 131b, 132b positioned above first light emitters 131a, 132a. Moreover, controller 120 may cause at least either first light emitters 131a, 132a or second light emitters 131b, 132b to emit light having a color according to the characteristic of an obstacle detected by detector 110.

Accordingly, controller 120 is capable of changing the location at which light emitter 130 emits light, according to the information on an obstacle. Particularly by separating the position of light emitter 130 (more specifically, the positions of right light emitter 131 and left light emitter 132) to the upper side and the lower side, driver 3 can easily and intuitively know which of first light emitters 131a, 132a and second light emitters 131b, 132b correspond to the front side of vehicle 400 and which of first light emitters 131a, 132a and second light emitters 131b, 132b correspond to the rear side of vehicle 400, respectively.

Moreover, the characteristic of an obstacle present in the vicinity of vehicle 400 may include location information of the obstacle. Further, when detector 110 detects an obstacle in the front area in the vicinity of vehicle 400, controller 120 may cause one of first light emitters 131a, 132a and second light emitters 131b, 132b to emit light. Furthermore, when detector 110 detects an obstacle in the rear area in the vicinity of vehicle 400, controller 120 may cause the other of first light emitters 131a, 132a and second light emitters 131b, 132b to emit light.

In many cases, an obstacle approaches vehicle 400 from the front of or from behind vehicle 400 during the driving of vehicle 400. With the configuration of in-vehicle lighting device 100 as described above, it becomes easier to notify driver 3 of whether an obstacle is present in front of or behind vehicle 400. As a result, driver 3 can easily and intuitively know whether an obstacle is present in front of or behind vehicle 400. This further enhances safety driving.

Moreover, one of first light emitters 131a, 132a and second light emitters 131b, 132b, which emit light when detector 110 detects an obstacle in the front area in the vicinity of vehicle 400, may have a larger light emitting area than the other of first light emitters 131a, 132a and second light emitters 131b, 132b which emit light when detector 110 detects an obstacle in the rear area in the vicinity of vehicle 400.

In many cases, an obstacle in the front area in the vicinity of vehicle 400 particularly has a high risk of accident during the driving of vehicle 400. With the configuration of in-vehicle lighting device 100 as described above, it is possible to easily notify driver 3 of an obstacle in the front area in the vicinity of vehicle 400. This further enhances safety driving.

Moreover, when detector 110 detects an obstacle in the front area in the vicinity of vehicle 400, controller 120 may cause first light emitters 131a and 132a to emit light. Moreover, when detector 110 detects an obstacle in the rear area in the vicinity of vehicle 400, controller 120 may cause second light emitters 131b and 132b to emit light.

Accordingly, controller 120 is capable of changing the location at which light emitter 130 emits light, according to information on an obstacle. Particularly by providing, on the lower side, first light emitters 131a and 132a that alert driver 3 to an obstacle in the front area in the vicinity of vehicle 400, driver 3 can easily and intuitively know which of first light emitters 131a, 132a and second light emitters 131b, 132b correspond to the front side of vehicle 400 and which of first light emitters 131a, 132a and second light emitters 131b, 132b correspond to the rear side of vehicle 400, respectively. This further enhances safety driving.

Moreover, first light emitters 131a and 132a may emit light having a color different from that of second light emitters 131b and 132b.

According to such a configuration, driver 3 can intuitively know whether an obstacle is in front of or behind vehicle 400, by a difference in colors. This further enhances safety driving.

Moreover, light emitter 130 may have a long shape extending along a pillar.

Stated differently, light emitter 130 (more specifically, right light emitter 131 and left light emitter 132, respectively) may have a long shape extending along respective pillars 7a and 7b. With this, it is possible to widen the light emitting area of light emitter 130 without going beyond the size of pillar 7a or 7b. This allows driver 3 to easily and intuitively know whether or not light emitter 130 emits light. This further enhances safety at the time of driving vehicle 400.

Moreover, in-vehicle lighting device 100 may further include distance measurer 300 that measures a distance between vehicle 400 and an obstacle present in the vicinity of vehicle 400. Furthermore, when detector 110 obtains the distance from distance measurer 300, controller 120 may cause light emitter 300 to emit light in a mode according to the obtained distance.

With such a configuration, it is possible to easily alert danger based on the distance between vehicle 400 and an obstacle. It is assumed that, as vehicle 400 approaches an obstacle, the risk of accident becomes higher. Therefore, with distance measurer 300 measuring the distance between vehicle 400 and an obstacle and also with controller 120 causing light emitter 130 to emit light in a mode according to the distance, driver 3 can easily and intuitively know the risk of accident. This further enhances safety at the time of driving vehicle 400.

Moreover, in-vehicle lighting device 100 may further include image sensor 200 which is installed in vehicle 400 and captures an image of an area in the vicinity of vehicle 400. Furthermore, detector 110 may detect an obstacle in the vicinity of vehicle 400 in an image obtained from image sensor 200.

With vehicle 400 provided with image sensor 202, even when the information on an obstacle in the vicinity of vehicle 400 cannot be obtained from an external network, for example, detector 110 is capable of detecting whether or not an obstacle is present in an image obtained by image sensor 200. Therefore, in-vehicle lighting device 100 can be used irrespective of the network environment surrounding vehicle 400.

In addition, vehicle 400 according to the embodiment includes in-vehicle lighting device 100.

This realizes vehicle 400 with more enhanced safety for driver 3 during the driving of vehicle 400.

Other Embodiment

Although the foregoing has described an in-vehicle lighting device according to the embodiment and a vehicle including the in-vehicle lighting device, the present disclosure shall not be limited to the above-described embodiment.

The above-described embodiment has described that light emitter 130 (more specifically, right light emitter 131 and left light emitter 132) is a surface-emitting light source and has a long shape extending along pillar 7a or 7b. The shape of the light emitter, however, is not limited to such. The light emitter may be, for example, a point light source.

Figure 12:
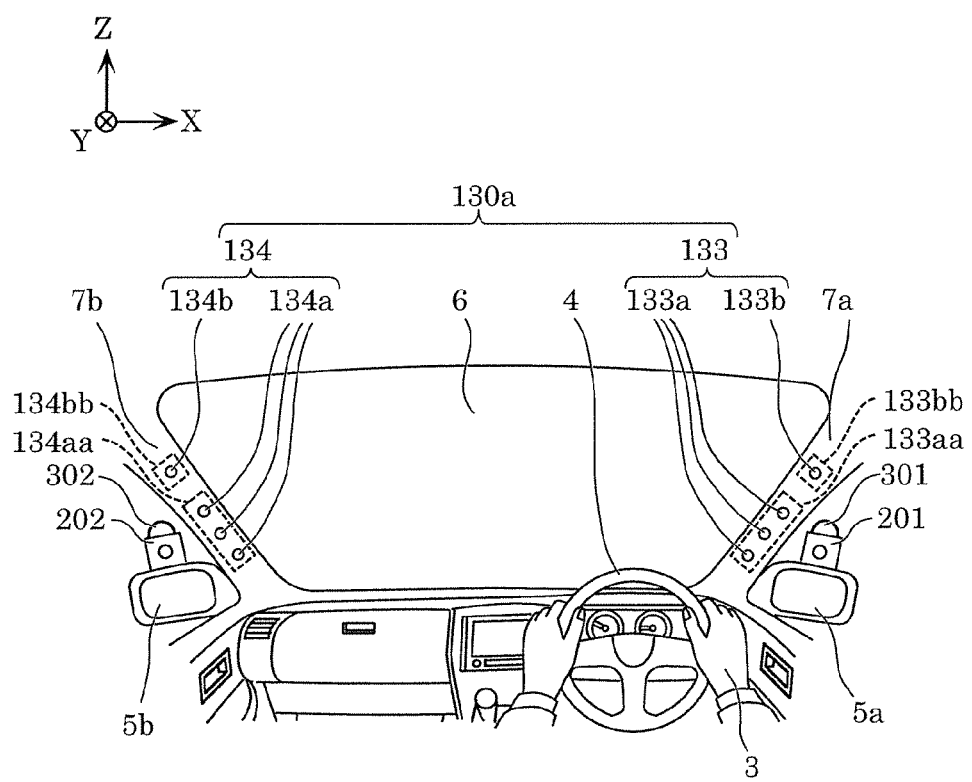
FIG. 12 is a diagram for explaining a variation of the light emitter of the in-vehicle lighting device according to the embodiment.

FIG. 12 is a diagram for explaining the inside of vehicle 400 in which a light emitter of the in-vehicle lighting device according to other embodiment is installed.

As illustrated in FIG. 12, light emitter 130a has right light emitter 133 and left light emitter 134. Right light emitter 133 includes first light emitter 133a and second light emitter 133b. Here, respective first light emitter 133a and second light emitter 133b are point light sources such as light emitting diodes (LEDs). More specifically, first light emitter 133a has three point light sources while second light emitter 133b has one point light source.

Similarly, left light emitter 134 includes first light emitter 134a and second light emitter 134b. First light emitter 134a and second light emitter 134b respectively are point light sources such as light emitting diodes (LEDs). More specifically, first light emitter 134a has three point light sources while second light emitter 134b has one point light source.

Thus, light emitter 130a may be composed of point light sources. Note that the number of point light sources that compose light emitter 130a is not particularly restricted to the number mentioned above.

Moreover, the previously-described embodiment has described that first light emitters 131a and 132a may respectively have a larger light emitting area than second light emitters 131b and 132b. In the case of light emitter 130a according to the other embodiment, the light emitting area may be defined, for example, according to the number of point light sources. Stated differently, the number of point light sources in respective first light emitters 133a and 134a may be greater than that in second light emitters 133b and 134b.

Alternatively, a light emitting area may be defined with respect to each of first light emitters 133a, 134a and second light emitters 133b, 134b based on an area that takes up pillar 7a or 7b. More specifically, first light emission sections 133aa and 134aa may have a larger surface than second light emission sections 133bb and 134bb. With this, it is possible to alert driver 3 to the risk of accident in the front side of vehicle 400 where an obstacle is present in many cases. Thus, with the in-vehicle lighting device according to the other embodiment, safety driving is further enhanced.

Moreover, in the previously-described embodiment, two light emitters 130 (more specifically, right light emitter 131 and left light emitter 132) are installed as first light emitters 131a and 132a and second light emitters 131b and 132b). However, three or more light emitters 130 (more specifically, right light emitter 131 and left light emitter 132) capable of emitting light of different colors according to the characteristic of an obstacle may be provided. For example, first light emitters 131a, 132a, second light emitters 131b, 132b positioned above first light emitters 131a and 132a, and the third light emitters positioned above second light emitters 131b and 132b may be provided.

Forms obtained by various modifications to the exemplary embodiment that can be conceived by a person of skill in the art as well as forms realized by arbitrarily combining structural components and functions in the exemplary embodiment which are within the scope of the essence of the present disclosure are included in the present disclosure.

While the foregoing has described one or more embodiments and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

What is claimed is:

1. An in-vehicle lighting device for alerting a driver driving a vehicle to an obstacle present in a vicinity of the vehicle, which obstructs driving of the vehicle, the in-vehicle lighting device comprising:

a light emitter that is installed in an interior side of a pillar located in a front part of the vehicle and that emits light of different colors;

a controller connected to the light emitter; and a detector that is connected to the controller and detects the obstacle present in the vicinity of the vehicle, wherein when the detector detects the obstacle present in the vicinity of the vehicle, the controller causes the light emitter to emit light having a color according to a characteristic of the obstacle detected, the light emitter includes a first light emitter and a second light emitter positioned above the first light emitter, and the controller causes at least one of the first light emitter and the second light emitter to emit light in accordance with the characteristic of the obstacle detected by the detector, the light having a color according to the characteristic of the obstacle detected, the characteristic of the obstacle present in the vicinity of the vehicle includes location information of the obstacle, the first light emitter has a larger light emitting area than the second light emitter, and the controller (i) causes the first light emitter to emit light when the detector detects the obstacle present in the front area in the vicinity of the vehicle, and (ii) causes the second light emitter to emit light when the detector detects the obstacle present in the rear area in the vicinity of the vehicle.

2. The in-vehicle lighting device according to claim 1, wherein the first light emitter emits light having a color different from a color of light emitted by the second light emitter.

3. The in-vehicle lighting device according to claim 2, wherein the color of the light emitted by the first light emitter and the color of the light emitted by the second light emitter are mutually different chromatic colors.

4. The in-vehicle lighting device according to claim 1, wherein the light emitter has a long shape extending along the pillar.

5. The in-vehicle lighting device according to claim 1, further comprising:

a distance measurer that measures a distance between the vehicle and the obstacle present in the vicinity of the vehicle, wherein when the detector obtains the distance from the distance measurer, the controller causes the light emitter to emit light in a mode according to the distance obtained.

6. The in-vehicle lighting device according to claim 1, further comprising:

an image sensor that is mounted on the vehicle and captures an image of an area in the vicinity of the vehicle, wherein the detector obtains the image captured by the image sensor and detects the obstacle present in the vicinity of the vehicle in the image obtained.

7. A vehicle comprising the in-vehicle lighting device according to claim 1.

* * * * *